United States Patent
Wagner et al.

(10) Patent No.: US 7,373,237 B2
(45) Date of Patent: May 13, 2008

(54) SPEED REGULATOR WITH DISTANCE REGULATING FUNCTION

(75) Inventors: Klaus-Peter Wagner, Weil der Stadt (DE); Hermann Winner, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/491,469

(22) PCT Filed: Sep. 17, 2002

(86) PCT No.: PCT/DE02/03486

§ 371 (c)(1),
(2), (4) Date: Sep. 1, 2004

(87) PCT Pub. No.: WO03/031217

PCT Pub. Date: Apr. 17, 2003

(65) Prior Publication Data

US 2005/0010351 A1  Jan. 13, 2005

(30) Foreign Application Priority Data

Oct. 5, 2001 (DE) .................. 101 49 146

(51) Int. Cl.
*B60T 7/12* (2006.01)
(52) U.S. Cl. .................. 701/96; 701/300; 340/903; 340/435; 342/107; 342/109
(58) Field of Classification Search .................. 701/96, 701/300, 301; 340/425.5, 903, 435, 436; 180/170; 342/107, 109
See application file for complete search history.

(56) References Cited

U.S. PATENT DOCUMENTS

| 5,955,967 A * | 9/1999 | Yamada ...................... 701/301 |
| 6,114,973 A * | 9/2000 | Winner et al. .............. 340/905 |
| 6,631,324 B2 * | 10/2003 | Okamura et al. ........... 701/301 |
| 6,717,546 B2 * | 4/2004 | Winter et al. ............... 342/165 |
| 6,888,622 B2 * | 5/2005 | Shimomura ................. 356/4.01 |
| 2001/0014846 A1 * | 8/2001 | Sawamoto et al. ........... 701/96 |

(Continued)

FOREIGN PATENT DOCUMENTS

| DE | 196 50 168 | 6/1998 |
| DE | 198 33 065 | 1/1999 |

(Continued)

OTHER PUBLICATIONS

"Adaptive Cruise Control System—Aspects and Development Trends" by Winner, Witte, Uhler and Lichtenberg, Robert Bosch GmbH, in SAE Technical Paper Series 961010, International Congress & Exposition, Detroit, Feb. 26-29, 1996.

*Primary Examiner*—Tuan C To
(74) *Attorney, Agent, or Firm*—Kenyon & Kenyon LLP

(57) ABSTRACT

A speed controller for motor vehicles is provided, the vehicle having a distance regulating function, a locating system for detecting locating data for objects that are in front of the vehicle, and an evaluation device for determining whether a located object needs to be treated as a relevant target object in the vehicle's lane. The speed controller includes a monitoring module that is designed to detect, by reference to the locating data, a situation in which objects not detected by the locating system are within close range and, in this situation, issue a takeover prompt to the driver.

7 Claims, 3 Drawing Sheets

U.S. PATENT DOCUMENTS

| | | | |
|---|---|---|---|
| 2001/0056326 A1* | 12/2001 | Kimura | 701/208 |
| 2002/0014988 A1* | 2/2002 | Samukawa et al. | 342/70 |
| 2002/0019694 A1* | 2/2002 | Sielagoski et al. | 701/96 |
| 2002/0138192 A1* | 9/2002 | Lueder et al. | 701/93 |
| 2002/0138193 A1* | 9/2002 | Miyahara | 701/96 |
| 2002/0165657 A1* | 11/2002 | Winner et al. | 701/93 |
| 2003/0158634 A1* | 8/2003 | Hellmann et al. | 701/1 |

FOREIGN PATENT DOCUMENTS

| | | |
|---|---|---|
| EP | 0 657 857 | 6/1995 |
| JP | 8-279099 | 10/1996 |
| JP | 10-3151801 | 12/1998 |
| JP | 11-039600 | 2/1999 |
| JP | 11-045398 | 2/1999 |

* cited by examiner

SPEED REGULATOR WITH DISTANCE REGULATING FUNCTION

FIELD OF THE INVENTION

The present invention relates to a speed controller for motor vehicles that includes a distance-regulating function, a locating system for detecting locating data for objects that are in front of the vehicle, and an evaluation device for determining whether a located object needs to be treated as a relevant target object in the vehicle's traffic lane.

BACKGROUND INFORMATION

Distance and speed controllers for motor vehicles are known in the art and are also referred to as ACC ("adaptive cruise control") systems. In these systems, objects such as vehicles ahead that are in the same traffic lane in which the controlled vehicle is traveling are detected using a locating system. The locating system can be a camera system or a radar system, using which the distance to the vehicle ahead and the relative speed can be measured. By using a direction-sensitive radar system or by relying on additional parameters such as the steering angle of the vehicle, the detected objects can be checked for plausibility so that, for example, vehicles in the vehicle's own lane can be distinguished from traffic signs or markings on the side of the road or from vehicles in other lanes. If a vehicle ahead in the same lane is within the locating range of the radar, the driving speed of the controlled vehicle is regulated through intervention in the vehicle's drive and braking systems such that a speed-dependent margin of safety from the vehicle ahead is maintained. If, on the other hand, there is no vehicle within the locating range in the same lane, then regulation to a speed desired by the driver, which has been entered using a set command, is effected. An example of a regulating system of this type is described in "Adaptive Cruise Control System—Aspects and Development Trends" by Winner, Witte, Uhler and Lichtenberg, Robert Bosch GmbH, in SAE Technical Paper Series 961010, International Congress & Exposition, Detroit, Feb. 26-29, 1996.

Such ACC systems were generally used previously in relatively stable traffic situations, which are characterized by relatively high vehicle speeds and correspondingly large distances between vehicles, especially during travel on superhighways or expressways. If the vehicle being tracked as the target object decelerates to a standstill in a traffic jam, for example, and the speed of the vehicle equipped with the ACC system is also decreased accordingly, then the speed controller automatically shuts off at a specific limiting speed on the order of magnitude of about 20 km/h, and an acoustic prompt is issued to the driver to take over the control of the vehicle and to decelerate the vehicle to a standstill. The reason for this shutoff is primarily that the detection range of the locating system has gaps in the close range so that, as the distances from the target objects decrease, the danger increases that an obstruction will not be detected and recognized, even if it is in the same traffic lane.

For example, the detection range in radar systems is limited by the geometry of the radar beam, which emanates divergently from the radar sensor and scans only a limited angle range so that the full width of the traffic lane is not detected until a certain distance in front of the vehicle is reached. Similar "blind spots" can also occur in camera systems or other known locating systems.

An object of the present invention is to provide a speed controller that makes it possible to expand the range of application of the regulating function to include low speeds, without having to make exaggerated demands on the detection range of the locating system.

SUMMARY

The above object is achieved according to the present invention by a monitoring module which is designed to detect, on the basis of the locating data, a dangerous situation in which objects not detected by the locating system are in close range, and in this situation issue a manual takeover prompt to the driver.

The present invention facilitates, in the cases in which reduction in speed to very low speeds or, if necessary, to a standstill, occurs during operation of the speed controller, a safe and reliable distance regulation up to the point the vehicle comes to a standstill in spite of the gaps within the detection range of the locating system. In most cases, the external vehicle that is selected as the target object for distance regulation will remain within the detection range until both vehicles have decelerated to a standstill. In these cases, there is no need, even when the speed falls below the previously set limiting speed, for the speed controller to be shut off and the driver to be prompted to manually take over. Special precautionary measures are necessary for the cases in which the tracked target object "disappears" from the detection range during reduction in speed and the associated reduction in distance because, for example, the two vehicles in the same traffic lane are moving in such a way that they are offset laterally from one another by a relatively great distance so that the vehicle ahead ends up in the blind spot of the radar system as the distance decreases. However, these situations that require a takeover prompt to the driver may be identified with a high degree of certainty based on prior history, i.e., based on the locating data measured immediately before the loss of the target object. It is therefore possible to limit the takeover prompt to these special cases.

The resulting expansion of the range of application of the speed controller results not only in a considerable increase in comfort for the driver, but it also contributes to an increase in traffic safety since the driver is relieved of distraction when driving up to the back end of a traffic jam and is thus able to pay more attention to what is happening in the adjacent lanes, so that, for example, he is able to recognize earlier when a driver of a vehicle in the adjacent lane is planning to change lanes and move into the safe interval between the vehicle and the vehicle ahead.

By avoiding unnecessary takeover prompts, the danger is also reduced that, in the event of a takeover prompt of this kind, the driver will irritate the traffic behind him through an overreaction such as sudden and excessive braking. By continuing automatic regulation even at very low speeds, it is also possible in this speed range to take full advantage of the fact that the locating system is able to detect changes in the distance and relative speed of the vehicle ahead significantly more accurately and earlier than the driver himself can, so that a faster and more appropriate reaction to changes in the deceleration or acceleration behavior of the vehicle ahead becomes possible.

ACC systems may be supplemented by what has been referred to as a "stop & go" or "stop & roll" function, by which, in the event of a traffic jam or slow-moving traffic, not only automatic braking to a standstill, but also starting up again and slow rolling in the traffic jam is automated. In conjunction with these functions, which may also be used in inner-city traffic, for example, the speed controller according to the present invention also proves to be particularly advantageous.

In an ACC system, or even in conjunction with the stop & go function, takeover prompts to the driver in the form of an acoustic and/or optical signal may also occur in other situations. In an ACC system, the amount of vehicle deceleration that is achievable through automatic intervention in the drive system or braking system of the vehicle is normally limited to values that do not result in a significant decrease in comfort or decrease in nuisance to the traffic behind it. If the system recognizes that the deceleration that is attainable in this way is not sufficient to avoid a collision with the vehicle ahead, then a takeover prompt is issued at that point, even in known systems. In the present invention, the takeover prompt has the same form as in these known systems so that the driver is not irritated by a variety of unfamiliar signals but, instead, is faced with a harmonized, easy-to-interpret and familiar man-machine interface.

Even if the target object that is being tracked is lost after the speed of the vehicle has fallen below the limiting speed of 20 km/h, this does not necessarily mean that a takeover prompt to the driver must be issued. For example, the loss of the target object may simply be due to the fact that the vehicle immediately ahead has changed lanes. This situation is also identifiable by reference to the measured locating data so that automatic regulation may also be continued in this case—if necessary, by selecting what had previously been the second closest vehicle ahead as the new target object.

In distinguishing between a change of lanes by the vehicle ahead and a loss of the target object, which requires a takeover prompt, it is possible to rely on known functions that are already implemented in existing ACC systems. For example, it is common in ACC systems having direction-sensitive radar for the lateral offset of the target object relative to the current straightline direction of the vehicle to be calculated in the evaluation device based on the directional and distance data for the target object. By tracking the curve of the cyclically consecutive lateral offset measurements over time, it is possible to determine whether the vehicle ahead has changed lanes or not. In addition, data containing information about directional changes by the vehicle such as steering angle or measured yaw rate or yaw acceleration may also be used, if necessary.

When a vehicle is equipped with an electronic stability program (ESP) for controlling dynamic behavior, then the vehicle may already have a yaw acceleration or yaw rate sensor. The data from this sensor may then also be used by the speed controller to detect and quantify directional changes by the vehicle. In particular, it is possible to calculate the current curve radius of the vehicle from the yaw rate in connection with the measured driving speed. In ACC systems, this information is used to predict the probable geometry of the traffic lane in which the vehicle is traveling so that even in the case of a curved road it is possible to determine, in connection with the lateral offset measurements, whether the target object is in the same lane or in an adjacent lane. Likewise, it is also possible using these data to detect a lane change by the vehicle. For this purpose, for example, the directional change of the vehicle as measured by the yaw rate sensor may be compared with the changes in the azimuth angle of one or several located objects.

If a lane change of the vehicle is detected at low speed (below 20 km/h), then this indicates that the driver already intends to take over control himself. Nonetheless, it may also be advisable for safety reasons to issue the takeover prompt in this case.

In conjunction with the plausibility evaluation, for the purpose of determining whether the target object is in the same traffic lane or in an adjacent lane, two evaluation numbers Pi and Pa are calculated in some ACC systems, numbers that specify the probability that the target object is inside (Pi) or outside (Pa) the same traffic lane. These evaluation numbers are continually updated as a function of the cyclically measured locating data, in which process the prior history is also included, generally in the form of sliding averages. If the target object has been in the same traffic lane for some time, this is indicated by a high value for Pi and a low value for Pa. If the target object is then suddenly lost, then this indicates that the target object is still in the same traffic lane and is no longer detected only because it is in the blind spot of the radar beam. In this case, the takeover prompt is issued as a consequence. If, on the other hand, the vehicle ahead changes lanes, then Pi decreases and Pa increases in the course of the lane change so that the difference between these evaluation numbers is reduced. If this difference is below a specific threshold value at the instant when the target object is lost, then it may be assumed that the target object has left the traffic lane, and speed regulation may be continued without issuing a takeover prompt.

The danger that a target object will disappear from the detection range even though it remains in the vehicle's traffic lane is particularly great when traveling along a curve. If the target object is located on the outer edge of the detection range relative to the curve, in particular, it is to be expected that this target object will be lost when the distance from the target object is further reduced and/or when the vehicles exit again from the curve. In this case, it may be advisable to issue a takeover prompt as a preventive measure, even before the target object actually leaves the detection range.

In general, the tighter the traveled curve is, the larger the close-range portion of the vehicle's traffic lane becomes that can no longer be detected by the locating system. If the current curve radius of the vehicle as calculated from the yaw rate and the driving speed is below a specific value, it may therefore be advisable to issue a takeover prompt even when there is no target object within the detection range—because the previously tracked vehicle changed to another lane a short time before, for example.

DETAILED DESCRIPTION

Figure 1:
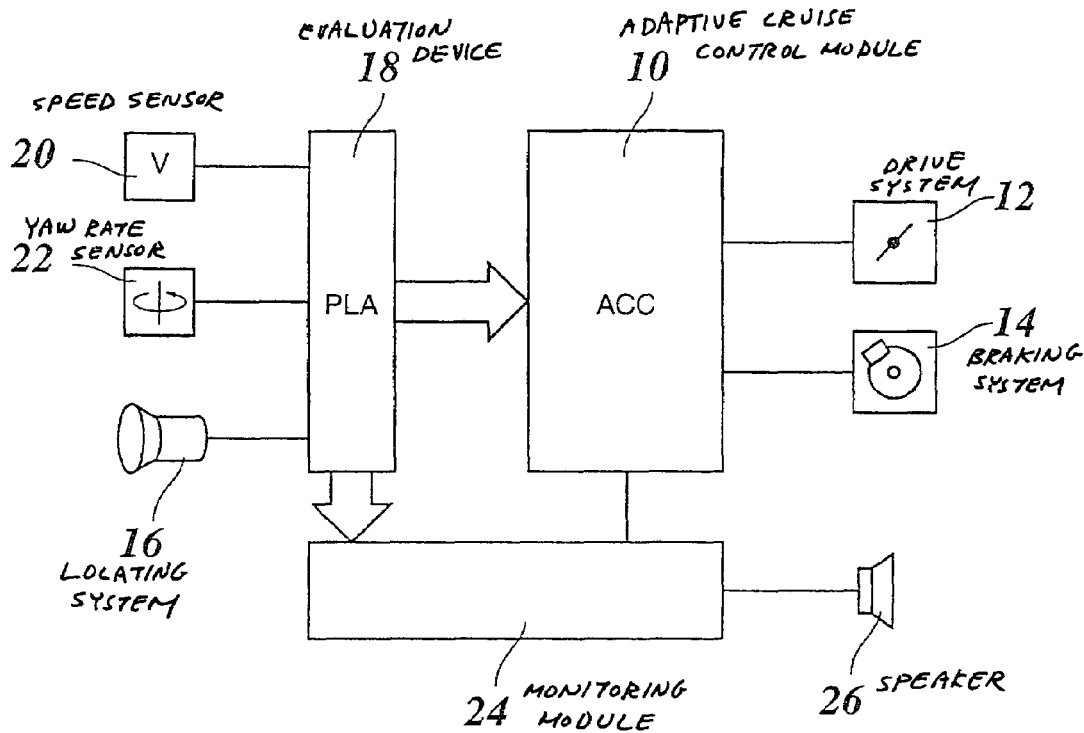
FIG. 1 shows a block diagram of an ACC (Adaptive Cruise Control) system.

Since the basic design and mode of operation of a speed controller or an ACC (adaptive cruise control) system for motor vehicles are known, FIG. 1 shows only the most important components of a system of this type in a simplified block diagram. The heart of the system is an ACC module 10 that intervenes in the motor vehicle's drive system 12 and braking system 14 and, if the road is clear, regulates the driving speed to the desired speed set by the driver. A locating system 16, in the form of a direction-selective multibeam radar mounted on the front of the vehicle in the example shown, measures the distances and relative speeds of the vehicles ahead and also the stationary targets that are within the detection range of the radar. The locating system 16 also measures the azimuth angle of the detected objects relative to the current straight-line direction of the vehicle. The locating data measured by locating system 16 for all detected objects is transmitted to an evaluation device 18 and there undergoes a plausibility evaluation in order to determine for each detected object whether it is a fixed stationary target such as a traffic sign on the edge of the road, oncoming vehicles in the lane for opposing traffic flow, or vehicles ahead. In the case of vehicles ahead, a distinction is also made as to whether they are traveling in the same traffic lane or in an adjacent lane as the controlled vehicle. If at least one vehicle ahead is in the same lane, evaluation device 18 selects the vehicle immediately ahead, i.e., the one the shortest distance away, as the target object.

For the plausibility evaluation, evaluation device 18 also receives the signal of a speed sensor 20, which measures the speed of the vehicle, and the output signal of a yaw rate sensor 22, which gives the current yaw rate of the vehicle. Stationary targets and oncoming vehicles may be identified by comparing the positive or negative relative speed measured by locating system 16 with the driving speed of the vehicle as measured by speed sensor 20. From the measured distance data and azimuth angles, evaluation device 18 calculates for each detected object a lateral offset at right angles to the current direction of travel of the vehicle using trigonometric functions. By comparing this lateral offset with the known typical width of a traffic lane, it is possible to determine (at least in the case of a straight road) whether the detected object is inside or outside the vehicle's traffic lane.

Since, however, the lateral offset of the vehicle relative to the center of the traffic lane is generally not precisely known, these decisions involve certain uncertainties, so that only probability assessments are possible. The latter are expressed by an evaluation number Pi for the probability that the vehicle ahead is in the same lane, and an evaluation number Pa for the probability that the vehicle ahead is not in the same lane. Additional information, if any, such as the position of road markings detected using a camera system or locating data from radar reflectors set up along the road may be used to improve accuracy.

The signals of yaw rate sensor 22 are primarily used to predict the probable curved shape of the vehicle's traffic lane on curvy stretches. For this purpose, the current radius of curvature of the path followed by the vehicle is calculated from the yaw rate and the measured driving speed. It may be assumed in first approximation that the shape of the curve of the vehicle's traffic lane corresponds to an arc having this radius. For the purpose of refinement, changes in the radius of curvature when entering or exiting a curve may be used for extrapolation, if necessary in combination with the measured lateral movements of the vehicles ahead.

The locating data for the selected target object is transmitted to ACC module 10, together with the measured speed of the vehicle, and there forms the basis for speed or distance regulation. If a target object such as a vehicle ahead is in the same lane, then the speed is reduced to a value below the desired speed selected by the driver in order to guarantee that the target object will be tracked at a safe, speed-dependent distance.

A monitoring module 24 is used to check continuously, by reference to the measured locating data and to known and/or measured vehicle performance parameters, whether the conditions for safe operation of the ACC system continue to exist. If this is not the case, such as when the tracked target object decelerates so abruptly that the maximum deceleration of the vehicle that can be achieved using the ACC system is not sufficient to maintain the desired distance so that active intervention by the driver is required, monitoring module 24 issues a manual takeover prompt to the driver via a speaker 26. This takeover prompt, which alerts the driver to the fact that the driver's active intervention in the driving process is required, may consist of a characteristic acoustic signal, for example. If the vehicle has a navigation system with voice output, the takeover prompt may also be a spoken instruction. Optionally or additionally, the takeover prompt may also be an optical signal, such as a blinking indicator light on the dashboard or the like.

Figure 2:
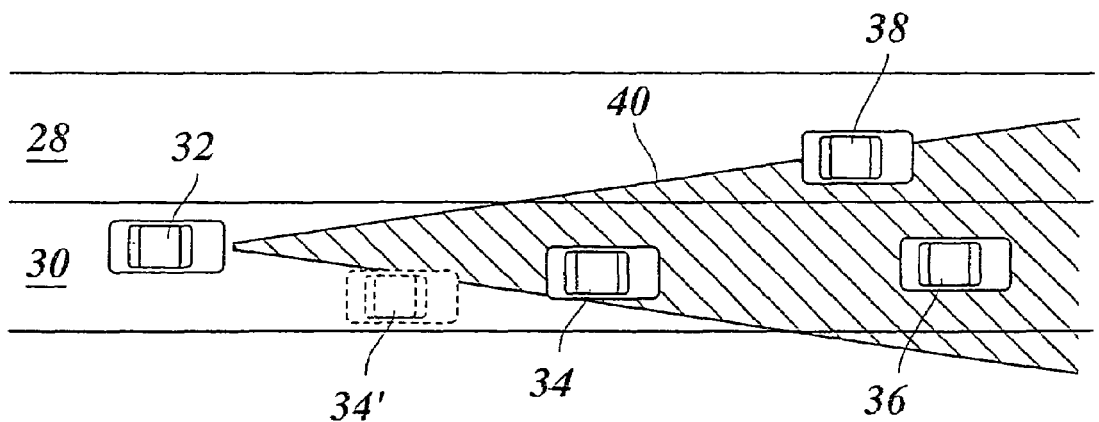
FIG. 2 shows a diagram illustrating a detection range of a locating system of a vehicle equipped with the ACC system.

FIG. 2 schematically shows a roadway having two traffic lanes 28, 30, in which a vehicle 32 equipped with an ACC system as shown in FIG. 1 (in the right-hand traffic lane 30) and three vehicles ahead 34, 36 and 38 are traveling. Detection range 40 of locating system 16, i.e., the range scanned by the radar beam of the radar sensor, is indicated by hatching. All three vehicles ahead 34, 36 and 38 are within detection range 40 so that their locating data is measured by locating system 16. Vehicles 34 and 36 are in the same traffic lane 30 as vehicle 32, while vehicle 38 is in adjacent traffic lane 28. Under these conditions, evaluation device 18 will select vehicle 34 as the target object.

As shown in FIG. 2, detection range 40 emanates in the shape of a fan from vehicle 32 and does not attain a width that corresponds approximately to the width of traffic lane 30 until a distance is reached that corresponds more or less to the distance to vehicle 34. Within the speed range in which the ACC system is normally operated (e.g. above 20 km/h), the usual margin of safety between vehicles (and therefore also the distance from target object 34) is so great that the target object is always within detection range 40 and may therefore be reliably detected. If, however, the speeds of the vehicles and also the distances between the vehicles are reduced in a traffic jam, a certain lateral offset of vehicles within the same traffic lane may cause the target object to disappear from detection range 40. This would be the case in FIG. 2, for example, where position 34' of the target object is shown by a broken line. Without additional safety measures, this would result in a situation in which evaluation device 18 now selects vehicle 36 as the new target object and the ACC module regulates the speed so that vehicle 32 drives closer to vehicle 36. In this situation, a collision with the vehicle in position 34', which is no longer detected, could result.

The ACC system according to the present invention is designed so that it always remains in operation, even at low vehicle speeds down to speed 0. In order to avoid the danger of a collision, monitoring module 24 has the function of detecting target objects such as the one shown in FIG. 2 by position 34' and, upon detecting such a potentially dangerous situation, issuing a manual takeover prompt.

Figure 3:
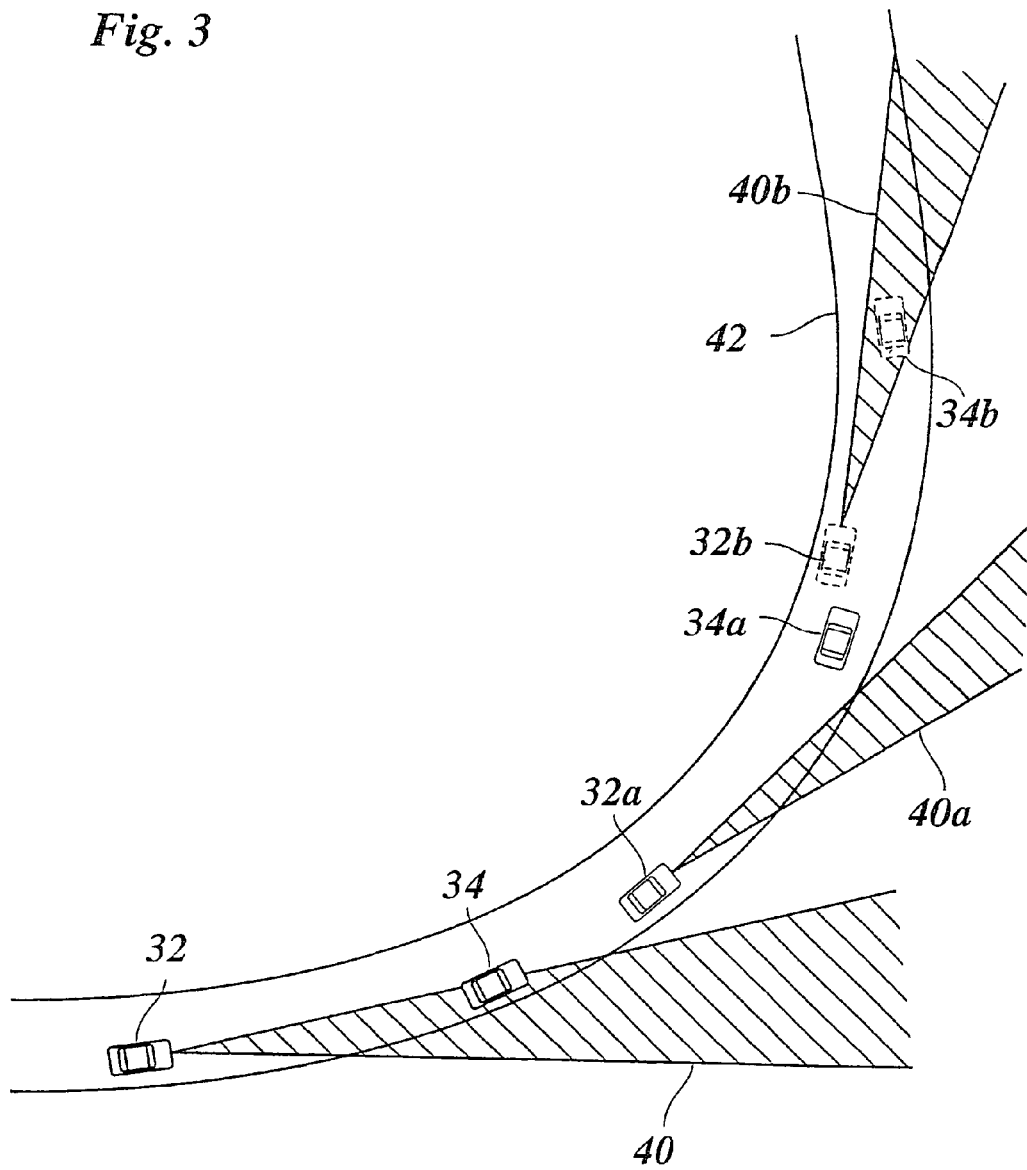
FIG. 3 shows examples of the loss of a target object from the locating range when traveling along a curve.

Other situations that are detected by monitoring module 24 are illustrated in FIG. 3. This figure shows a curved roadway 42. The positions of vehicles 32 and 34 are shown in bold lines while they are entering a curve that gradually becomes tighter. Due to the curvature of road 42, vehicle 34 has migrated to the left edge of detection range 40. This migration is tracked by evaluation device 18 by reference to the change in the associated azimuth angle. On the basis of this azimuth angle alone, however, it is not possible to determine whether vehicle 34 has entered a curve or has changed lanes. However, the signal of yaw rate sensor 22 indicates, as supplementary information, that vehicle 32 has also already entered the curve. This points to the fact that there has been no change of lanes, and that vehicle 34 is continuing to travel in the same lane as vehicle 32. On the basis of the continuing change in the azimuth angle of vehicle 34, it is to be expected that this vehicle, as it travels further into the curve, will migrate out of detection range 40 or detection range 40a, which is illustrated in conjunction with vehicle positions 32a and 34a, which are shown by thinner lines. For this reason, the manual takeover prompt will also be issued to the driver in this situation. It is not necessary in this case to wait until vehicle 34 has actually left the detection range.

Positions 32b and 34b in FIG. 3 illustrate a situation in which, similar to FIG. 2, the vehicle ahead will disappear from the detection range if vehicle 32, which is equipped with the ACC system, approaches more closely. In this situation in FIG. 3, the target object will also be lost even if the distance is unchanged because the two vehicles exit from the curve and in the process detection range 40b is rotated relative to the target object in such a way that the vehicle ahead is no longer detected. Monitoring module 24 detects, by reference to the signal from yaw rate sensor 22, that the vehicle is traveling along a left-hand curve and, by reference to the locating data, that the target object is migrating to the right-hand edge of the detection range. This, too, results in the output of a takeover prompt.

FIG. 3 shows, furthermore, that as the vehicle is traveling along the curve, detection range 40a no longer overlaps very much at all with the traffic lane in which the vehicle is traveling. This problem, i.e., vehicles ahead get lost temporarily in a curve, also occurs in the case of standard ACC regulation at higher speeds and at greater vehicle distances, but is less serious in those cases because the curve radii of expressways and superhighways are generally very large and because the vehicle ahead will certainly be detected again by the radar beam as soon as the vehicles exit from the curve. When speeds are lower and the distances smaller and, in particular, when traveling on country roads having tighter curves, it may happen, on the other hand, that the vehicle ahead is lost in the curve and that the distance has been reduced to such an extent that, even before the vehicles exit again from the curve, the vehicle ahead is now in a blind spot outside the detection range. At a low vehicle speed, it is therefore generally advisable to issue a takeover prompt when the measured curve radius is so small that the detection range is no longer able to cover a sufficiently large portion of the vehicle's traffic lane.

Figure 4:
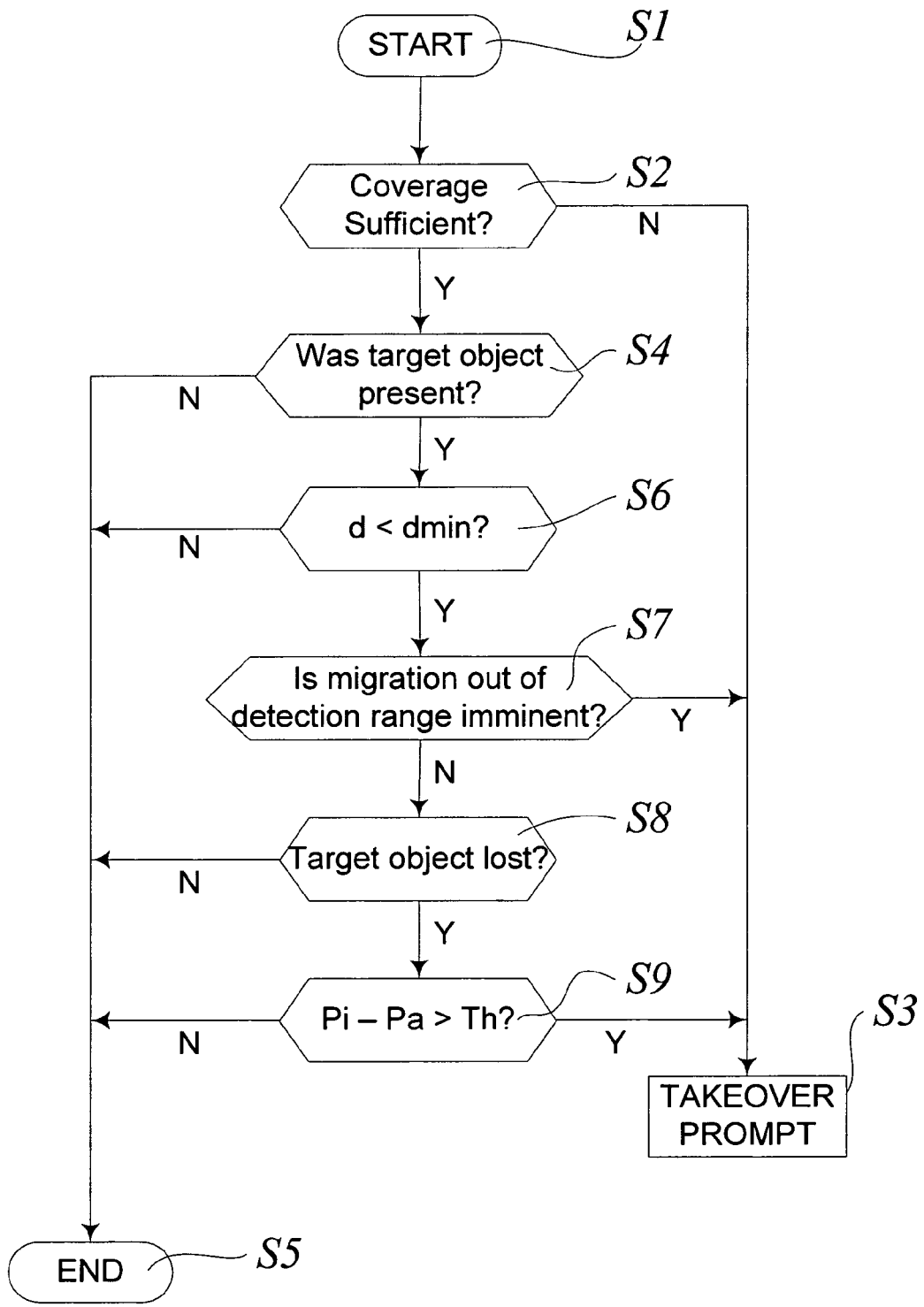
FIG. 4 shows a flow chart of a monitoring routine that is implemented in the ACC system according to the present invention.

FIG. 4 shows a flow chart of an example of a monitoring routine by which the functions of monitoring module 24, as described above, may be implemented. The monitoring routine is called up periodically (S1), using a cycle time on the order of magnitude of several milliseconds, for example. As an option, the call of the monitoring routine may be omitted if the measured speed of the vehicle is above a defined value, such as above 60 km/h. In step S2, a decision is made based on the curve radius determined using the signal of yaw rate sensor 22 as to whether the detection range adequately covers the vehicle's traffic lane. If this is not the case, the takeover prompt is issued immediately (S3). If sufficient coverage exists (curve radius is greater than a specific threshold value), then in step S4 the system checks to determine, by reference to the locating data previously transmitted by evaluation device 18, whether a target object was still present in the preceding cycle of the monitoring routine. If this was not the case—because the target object that caused the speed to be reduced has already been lost earlier due to a lane change, for example—then the program is terminated with step S5, without a takeover prompt being issued.

If the presence of a target object was established in step S4, then in step S6 the system checks to determine whether the last measured distance d from this target object to the vehicle is smaller than a specified threshold value dmin. If distance d is greater than this value, then the detection range at the location of the target object is so wide that it would only be possible for the target object to be lost if it leaves the vehicle's traffic lane. Under these conditions, no takeover prompt is required, and the program is again terminated with step S5. The value dmin may be 20 m, for example; however, it may also be varied as a function of the curve radius calculated in step S2.

If a smaller distance from the target object has been established, then a check is made in step S7 by reference to the locating data transmitted from evaluation device 18, and also by reference to the speed and yaw rate data, to determine whether one of the situations illustrated in FIG. 3 by bold or broken lines is present, i.e., situations in which migration of the target object out of the detection range is imminent. In this case, the program jumps to step S3, and the takeover prompt is issued.

Otherwise, a check is made in step S8 to determine whether the target object has actually been lost. If this is not the case, then this target object may continue to be tracked, and the program is terminated with step S5 without a takeover prompt.

If, on the other hand, the target object was lost, then a check is made in step S9 to determine whether the difference between the above-mentioned evaluation numbers Pi and Pa is greater than a specific threshold value Th. If this difference is greater than the threshold value, then this means that the target object was with maximum probability in the vehicle's traffic lane immediately before it was lost, and therefore it is to be expected that it is still in the vehicle's traffic lane. In this case, therefore, the program branches off to the takeover prompt in step S3. If, on the other hand, the difference between Pi and Pa is not greater than the threshold value, then the cause of the disappearance of the target object is determined to be that the vehicle ahead has changed lanes. In this case, speed regulation may therefore be continued, and the program is terminated with step S5, again without a takeover prompt.

In all the cases in which the takeover prompt was issued in step S3, the program is then terminated with step S5.

Although the evaluation numbers Pi and Pa are measures of the probability that the vehicle is in or outside its own traffic lane, these evaluation numbers do not need to be normalized so that their total is always equal to 1. Since different criteria may be used under certain conditions for determining the evaluation numbers Pi and Pa, their total may vary depending on the situation. Instead of evaluating the difference between Pi and Pa, the evaluation in step S6 may also be made by forming the ratio of these evaluation numbers or by using some other algorithm that ensures that direct branching to step S5 will only occur if it is possible to conclude with great certainty that the target object has left the vehicle's lane.

Another possible modification involves switching around the sequence of steps S6 and S7.

Furthermore, other criteria for a situation in which the target objects exit from the detection range is imminent may also be checked in step S7. Such a criterion might be, for example, that the target object has, on a straight road, a lateral offset from the vehicle that differs from 0 but still within the vehicle's traffic lane (the check is analogous to step S9) and in the target object's coming closer due to the decrease in the distance from the left or right boundary of the detection range.

For the decision as to whether the target object has left the vehicle's traffic lane (step S9), the change in the lateral offset that was measured in the past may also be tracked, if necessary, and extrapolated to the future.

In a modified embodiment, the takeover prompt may be followed by further measures that ensure that the driver reacts to the takeover prompt. Such a measure may be, for example, the forcible reduction in speed, after expiration of a certain waiting time after the takeover prompt, if the driver has not operated the gas pedal or the brake in the interim.

What is claimed is:

1. A speed controller for a motor vehicle, comprising:
    a locating system for detecting locating data for an object that is in front of the vehicle;
    an evaluation device for determining whether a detected object needs to be treated as a relevant target object in the vehicle's traffic lane;
    a monitoring module configured to detect, with the aid of the locating data, a situation in which a danger exists that an object not detected by the locating system is within a predetermined range, wherein, in this situation, the monitoring module triggers a takeover prompt to a driver of the vehicle; and
    a control arrangement configured to act on at least one of a drive system and a braking system of the vehicle, when a stationary target object is detected, so that the vehicle is automatically decelerated to a standstill;
    wherein the evaluation device is configured to calculate, with the aid of the locating data, at least two evaluation numbers that specify the probability that the target object is in the vehicle's traffic lane, and wherein, in the event of one of an imminent loss and actual loss of the target object from the detection range of the locating system, the monitoring module determines, with the aid of the two evaluation numbers, whether the target object has one of left the vehicle's traffic lane and is still in the vehicle's traffic lane, and if the target object is still in the vehicle's traffic lane, triggers the takeover prompt;
    wherein the calculation of the at least two evaluation numbers includes: a) calculating for each detected object, using the locating data with the aid of trigonometric functions, a lateral offset in a direction perpendicular to the direction of travel of the vehicle, wherein the locating data includes measured distance to the detected object and azimuth angle of the detected object relative to the direction of travel of the vehicle; and b) comparing the lateral offset to a known, typical width of a lane, whereby the at least two evaluation numbers are derived, the at least two evaluation numbers including a first probability value corresponding to the detected object being in the lane of the vehicle and a second probability value corresponding to the detected object being outside of the lane of the vehicle.

2. The speed controller according to claim 1, wherein the monitoring module only triggers the takeover prompt if a distance of the target object from the vehicle is smaller than a specified threshold value.

3. The speed controller according to claim 2, wherein the evaluation device determines, with the aid of an output signal of at least one sensor, whether the vehicle is traveling along a curve, and if the vehicle is traveling along a curve, calculates a curve radius, and wherein the monitoring module also evaluates the curve radius in addition to the locating data in detecting a situation in which danger exists.

4. The speed controller according to claim 3, wherein the monitoring module varies the threshold value as a function of the curve radius.

5. The speed controller according to claim 3, wherein the monitoring module triggers the takeover prompt independent of whether a target object has been detected, if the curve radius is smaller than a predefined value.

6. The speed controller according to claim 1, wherein the locating system is a radar sensor.

7. The speed controller according to claim 1, wherein the takeover prompt is an acoustic signal generated by a speaker.

* * * * *